United States Patent
Omori

(10) Patent No.: US 10,477,037 B2
(45) Date of Patent: Nov. 12, 2019

(54) COMMUNICATION APPARATUS THAT TRANSMITS SETTING DATA CONTROL METHOD OF THE SAME, AND STORAGE MEDIUM

(71) Applicant: CANON KABUSHIKI KAISHA, Tokyo (JP)

(72) Inventor: Seiya Omori, Moriya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 15/750,603

(22) PCT Filed: Oct. 3, 2016

(86) PCT No.: PCT/JP2016/004443
§ 371 (c)(1),
(2) Date: Feb. 6, 2018

(87) PCT Pub. No.: WO2017/073017
PCT Pub. Date: May 4, 2017

(65) Prior Publication Data
US 2019/0020766 A1   Jan. 17, 2019

(30) Foreign Application Priority Data
Oct. 28, 2015   (JP) .................................. 2015-212334

(51) Int. Cl.
*H04N 1/00* (2006.01)
*H04W 76/10* (2018.01)
(Continued)

(52) U.S. Cl.
CPC .......... *H04N 1/00127* (2013.01); *H04N 1/00* (2013.01); *H04W 4/00* (2013.01); *H04W 4/80* (2018.02);
(Continued)

(58) Field of Classification Search
None
See application file for complete search history.

(56) References Cited

U.S. PATENT DOCUMENTS 8,922,820 B2   12/2014   Asai
8,958,100 B2   2/2015   Nishikawa et al.
(Continued)

FOREIGN PATENT DOCUMENTS

JP   2007274567 A   10/2007
JP   2014050015 A   3/2014
(Continued)

OTHER PUBLICATIONS

International Search Report issued in Intl. Appln. No. PCT/JP2016/004443 dated Dec. 27, 2016.
(Continued)

*Primary Examiner* — Andrew H Lam
(74) *Attorney, Agent, or Firm* — Rossi, Kimms & McDowell LLP

(57) ABSTRACT

A communication apparatus stores information to perform wireless communication using the first communication method with an information processing apparatus. When a mode in which the setting data is transmitted by using wireless communication established based on the stored information has been set, the communication apparatus uses the wireless communication based on the stored information and transmits the setting data to the information processing apparatus. On the other hand, when a mode in which the setting data is transmitted by using wireless communication established based on the stored information has not been set, information for wireless communication is obtained from the information processing apparatus, the wireless communication using the first communication method based on the
(Continued)

obtained information is established, and the setting data is transmitted to the information processing apparatus.

13 Claims, 12 Drawing Sheets

(51) Int. Cl.
*H04W 4/00* (2018.01)
*H04W 88/06* (2009.01)
*H04W 76/15* (2018.01)
*H04W 4/80* (2018.01)
*G06F 3/00* (2006.01)
*H04W 4/50* (2018.01)
*G06F 3/12* (2006.01)

(52) U.S. Cl.
CPC ........... *H04W 76/10* (2018.02); *H04W 76/15* (2018.02); *H04W 88/06* (2013.01); *G06F 3/00* (2013.01); *G06F 3/1236* (2013.01); *H04N 2201/006* (2013.01); *H04N 2201/0094* (2013.01); *H04W 4/50* (2018.02)

(56) References Cited

U.S. PATENT DOCUMENTS

| | | | |
|---|---|---|---|
| 2007/0229670 A1 | 10/2007 | Soga | |
| 2011/0085196 A1* | 4/2011 | Liu | G06F 3/1204 358/1.15 |
| 2012/0178369 A1* | 7/2012 | Kim | H04W 4/043 455/41.2 |
| 2014/0063537 A1* | 3/2014 | Nishikawa | H04L 69/18 358/1.15 |
| 2014/0293327 A1* | 10/2014 | Miyazaki | G06F 3/1236 358/1.15 |
| 2014/0293331 A1* | 10/2014 | Asai | G06F 3/1286 358/1.15 |

FOREIGN PATENT DOCUMENTS

| | | |
|---|---|---|
| JP | 2014195150 A | 10/2014 |
| KR | 1020120080822 A | 7/2012 |
| WO | 2004040206 A | 2/2004 |

OTHER PUBLICATIONS

Written Opinion issued in Intl. Appln. No. PCT/JP2016/004443 dated Dec. 27, 2016.

Office Action issued in Korean Application No. 10-2018-7013849 dated Mar. 13, 2019.

* cited by examiner

[Fig. 1]
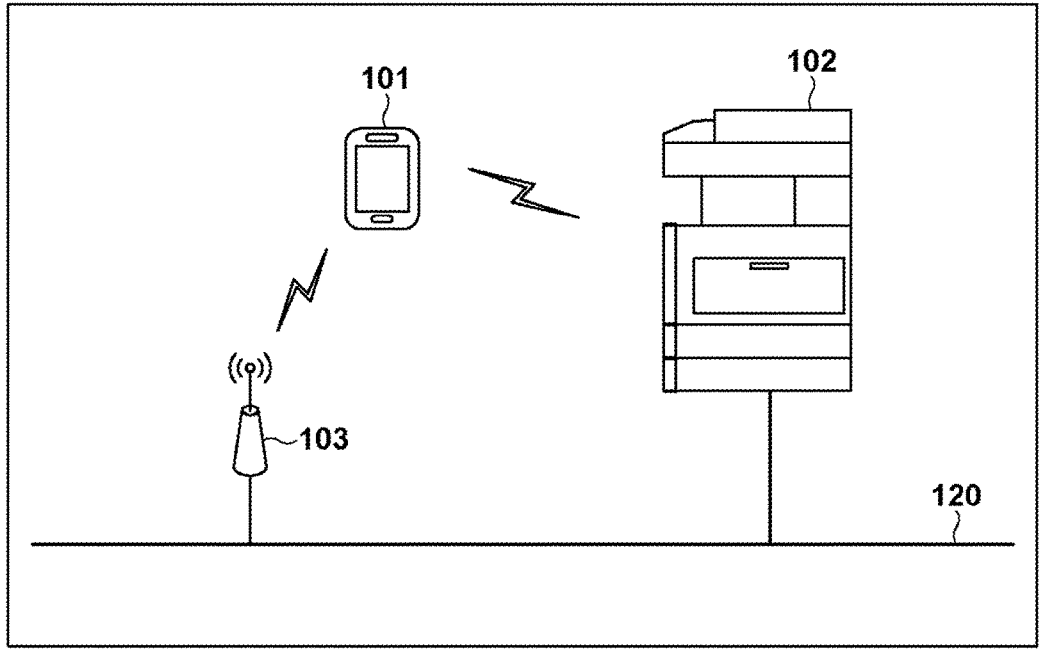

[Fig. 2]
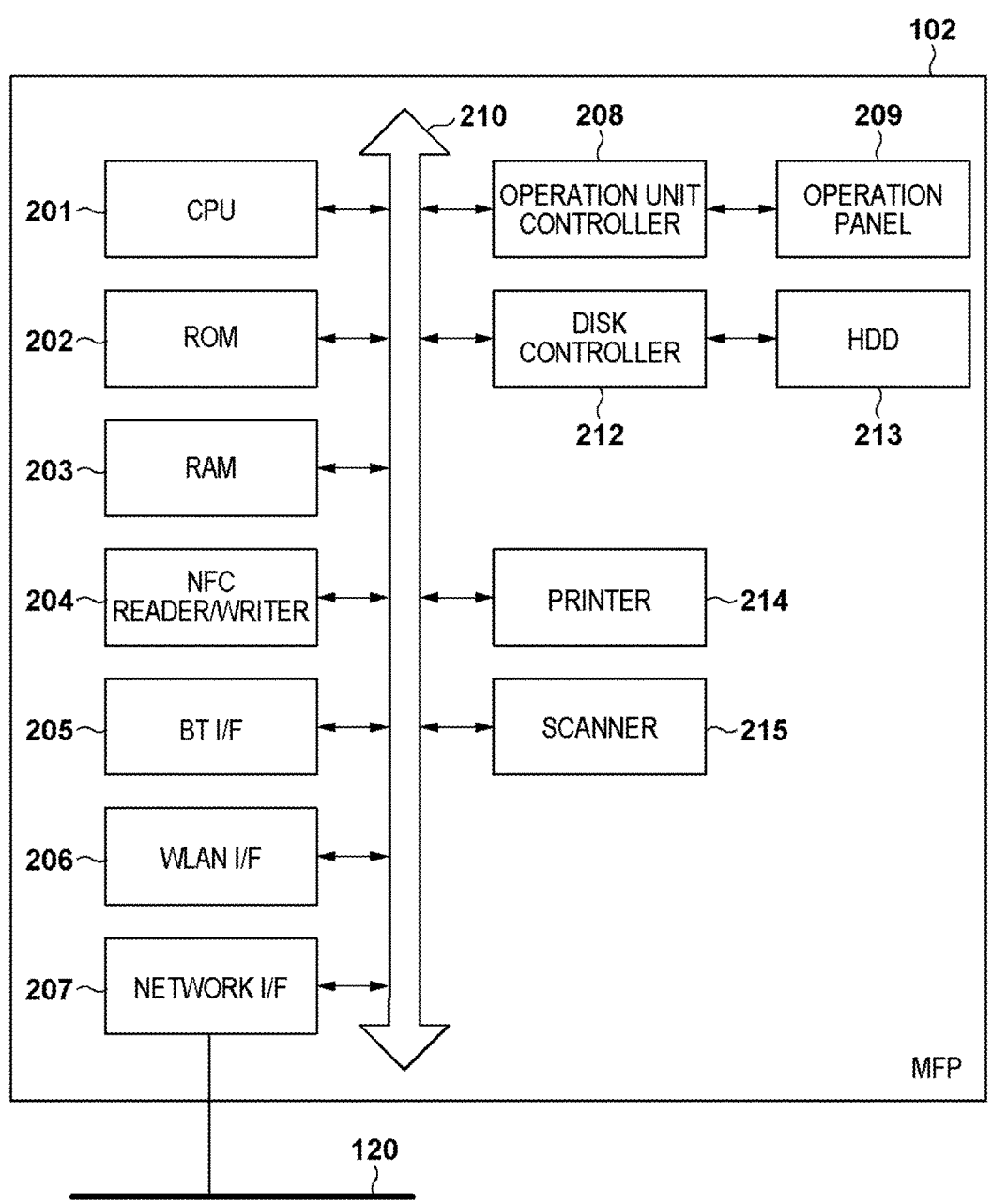

[Fig. 3]
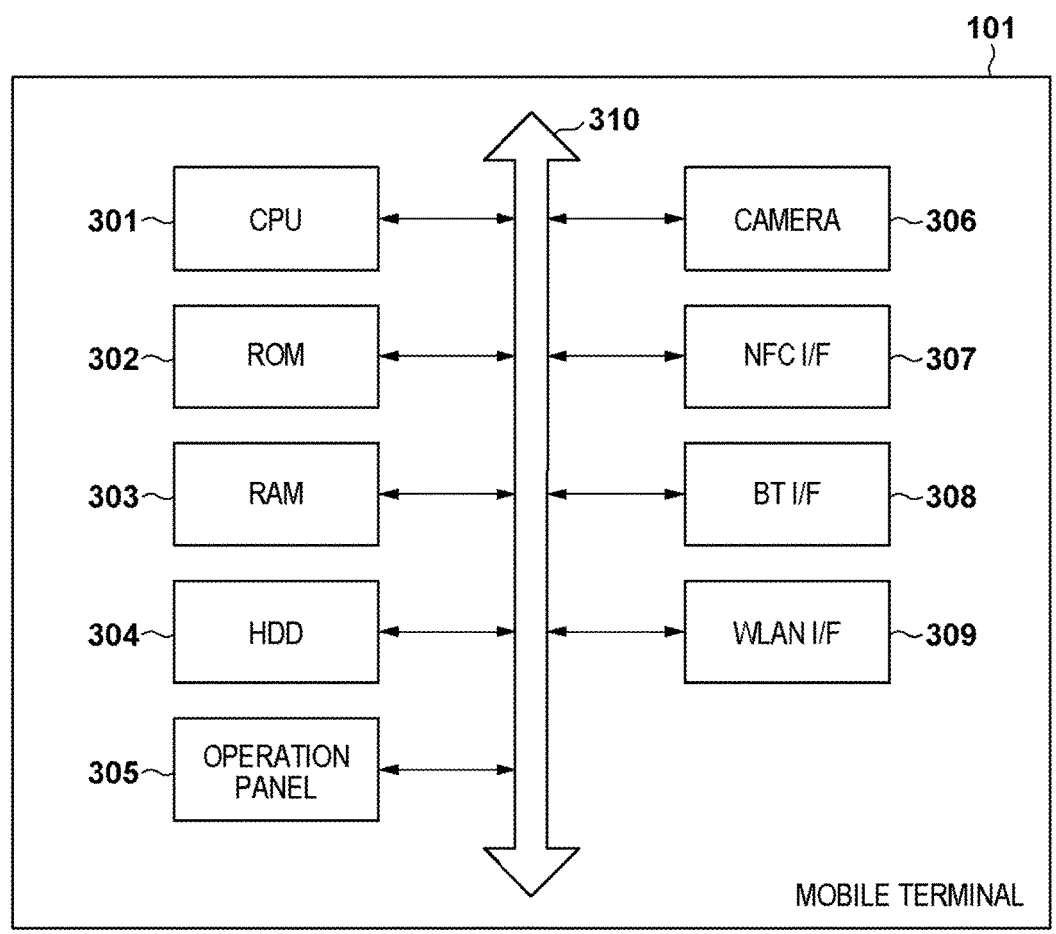

[Fig. 4A]
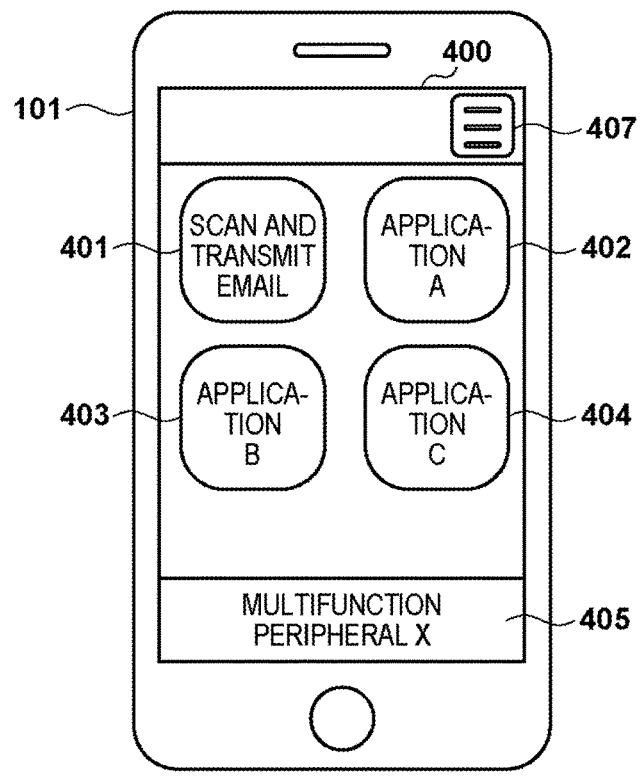
[Fig. 4B]
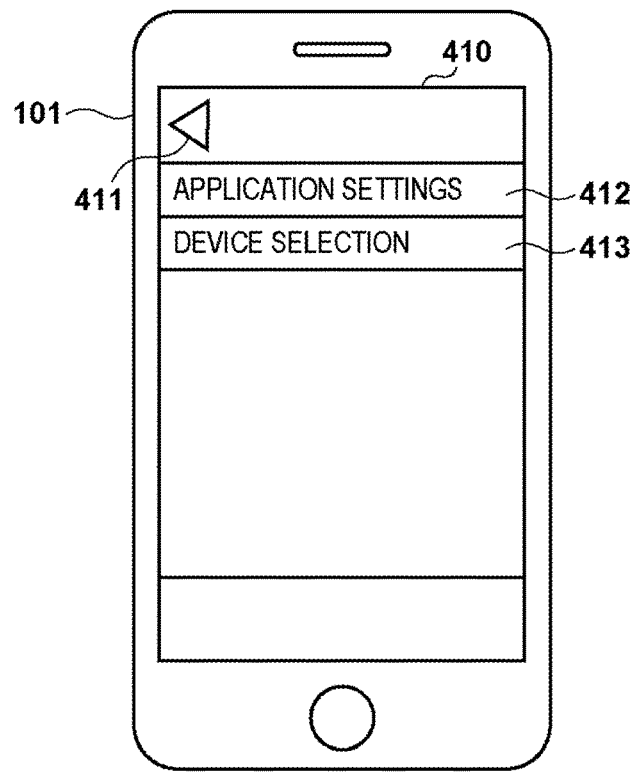

[Fig. 5A]
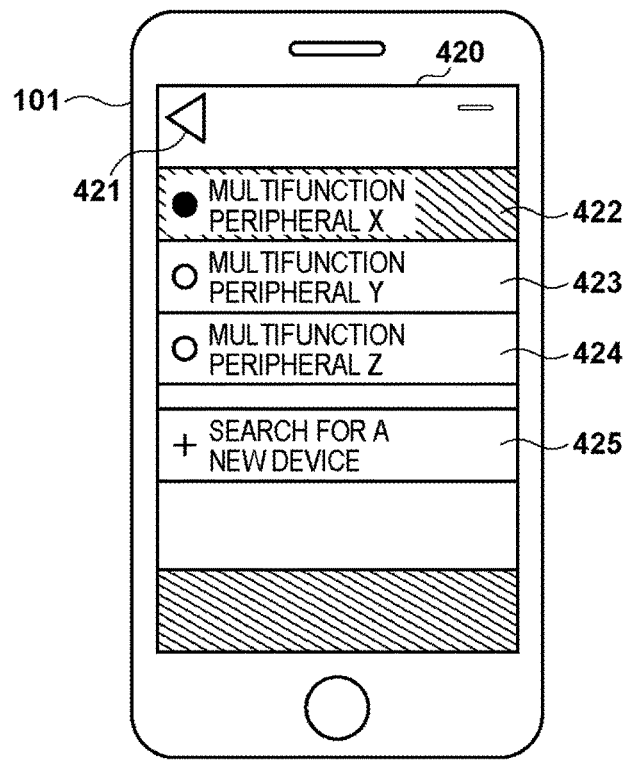
[Fig. 5B]
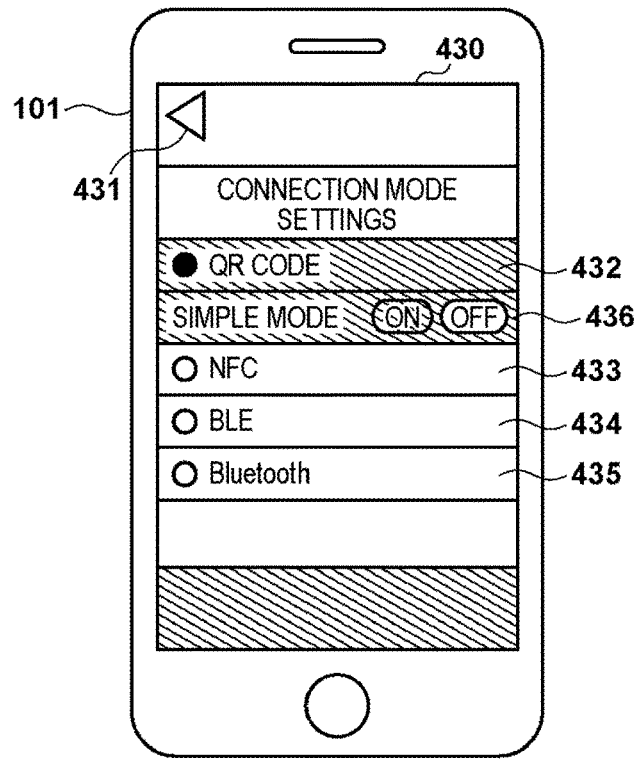

[Fig. 6]
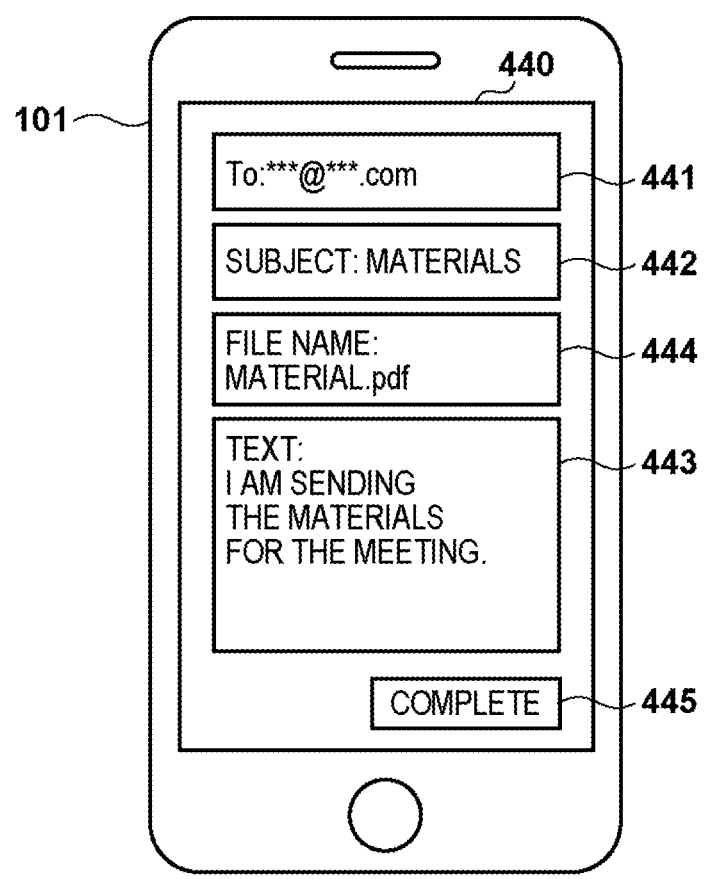

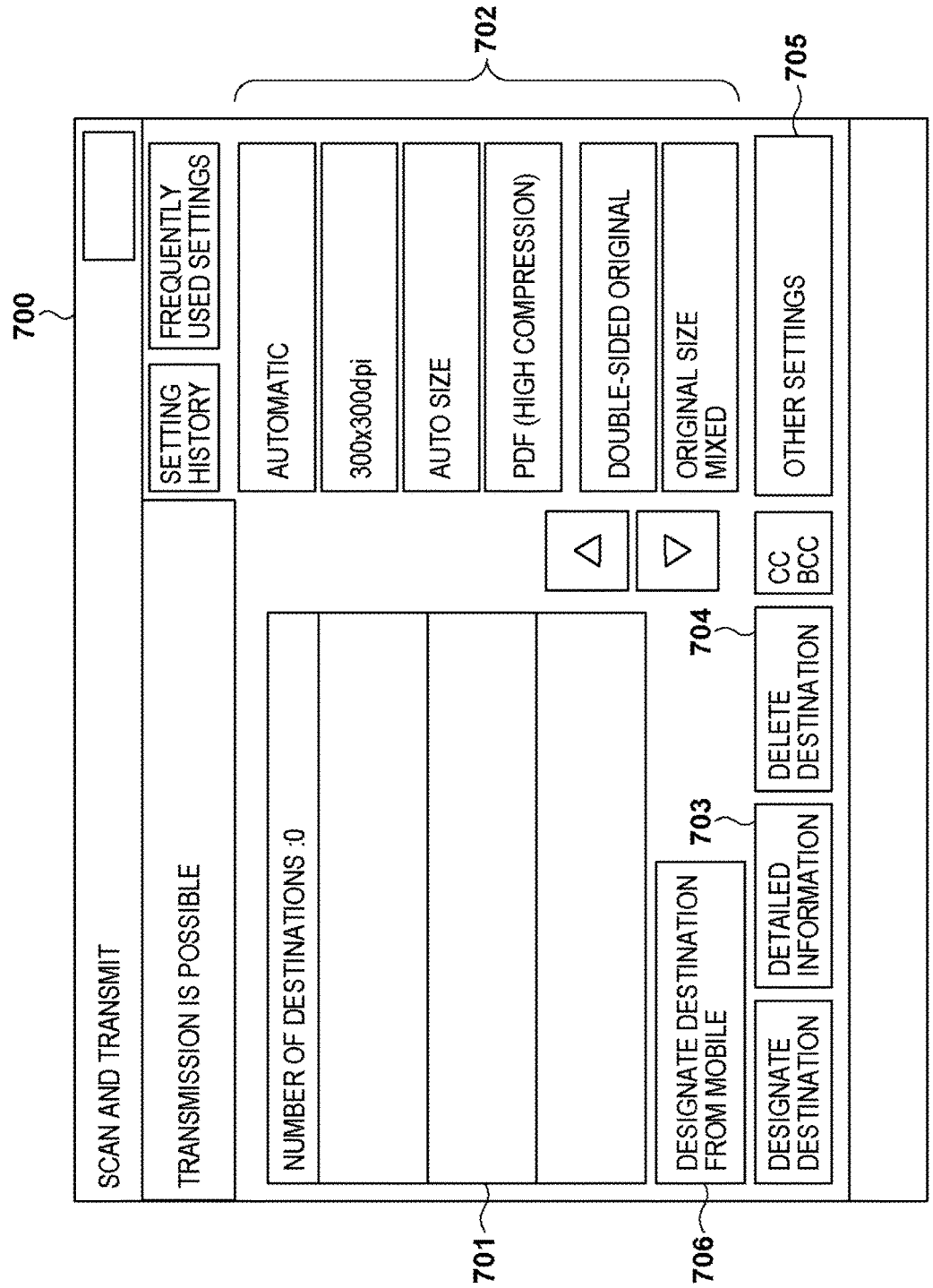
[Fig. 7A]

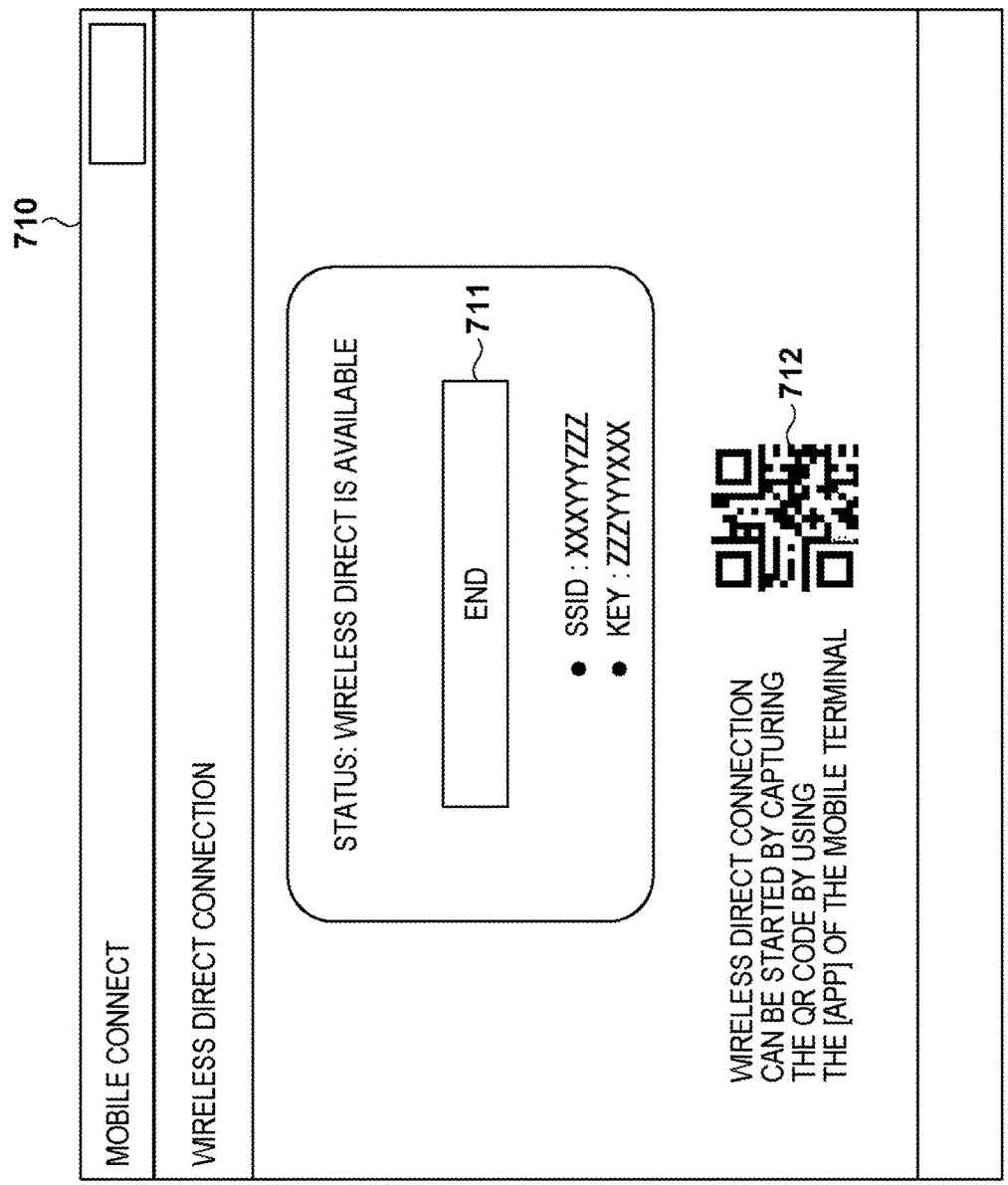

[Fig. 8A]

SCAN AND TRANSMIT

TRANSMISSION IS POSSIBLE

NUMBER OF DESTINATIONS :2

00 KATO kato@example.com

00 YAMADA yama@example.com

DESIGNATE DESTINATION FROM MOBILE

DESIGNATE DESTINATION

DETAILED INFORMATION

DELETE DESTINATION

CC BCC

◁ ▷

SETTING HISTORY

FREQUENTLY USED SETTINGS

AUTOMATIC

300x300dpi

AUTO SIZE

PDF (HIGH COMPRESSION)

DOUBLE-SIDED ORIGINAL

ORIGINAL SIZE MIXED

OTHER SETTINGS

720

721

725

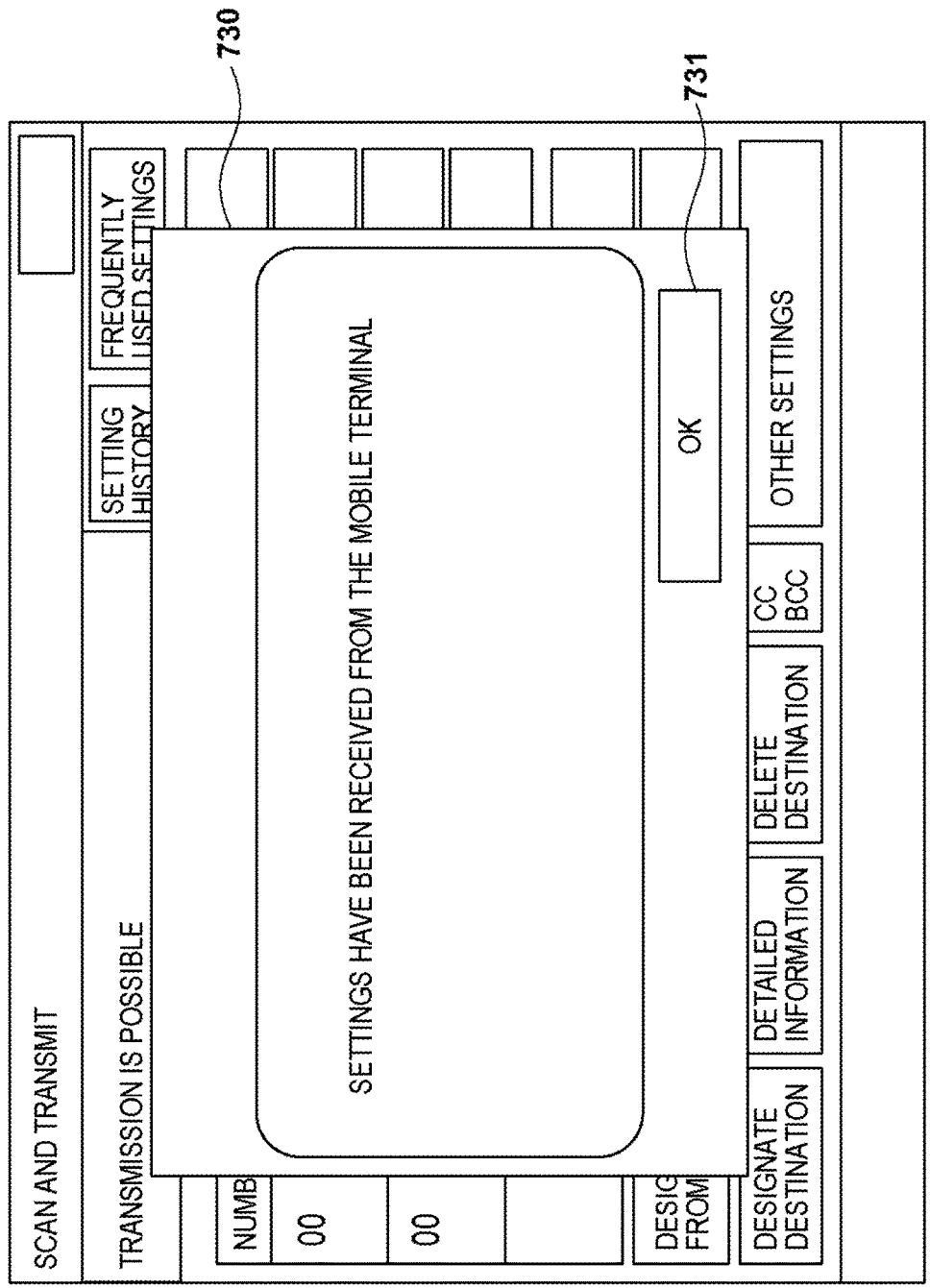

[Fig. 9]
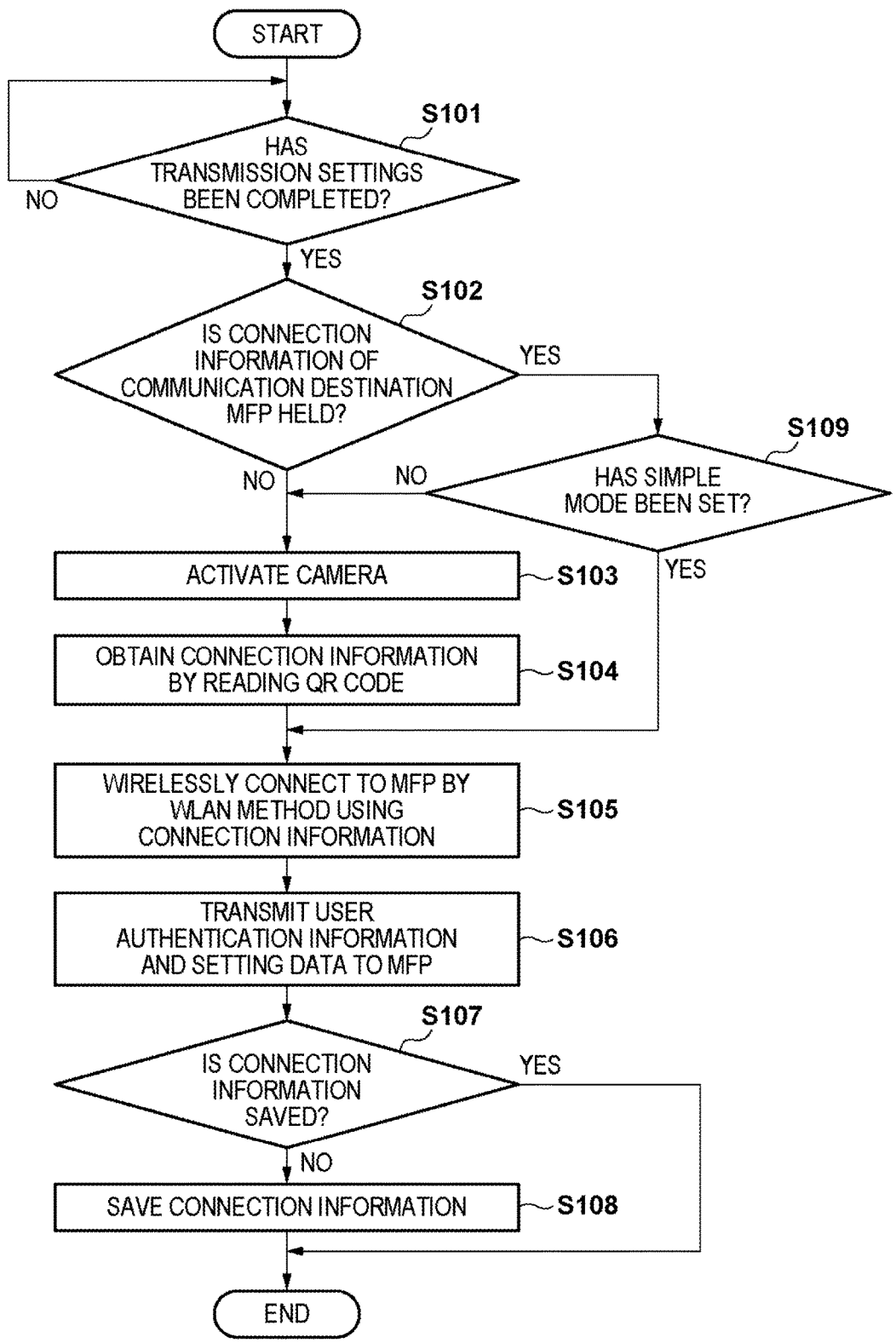

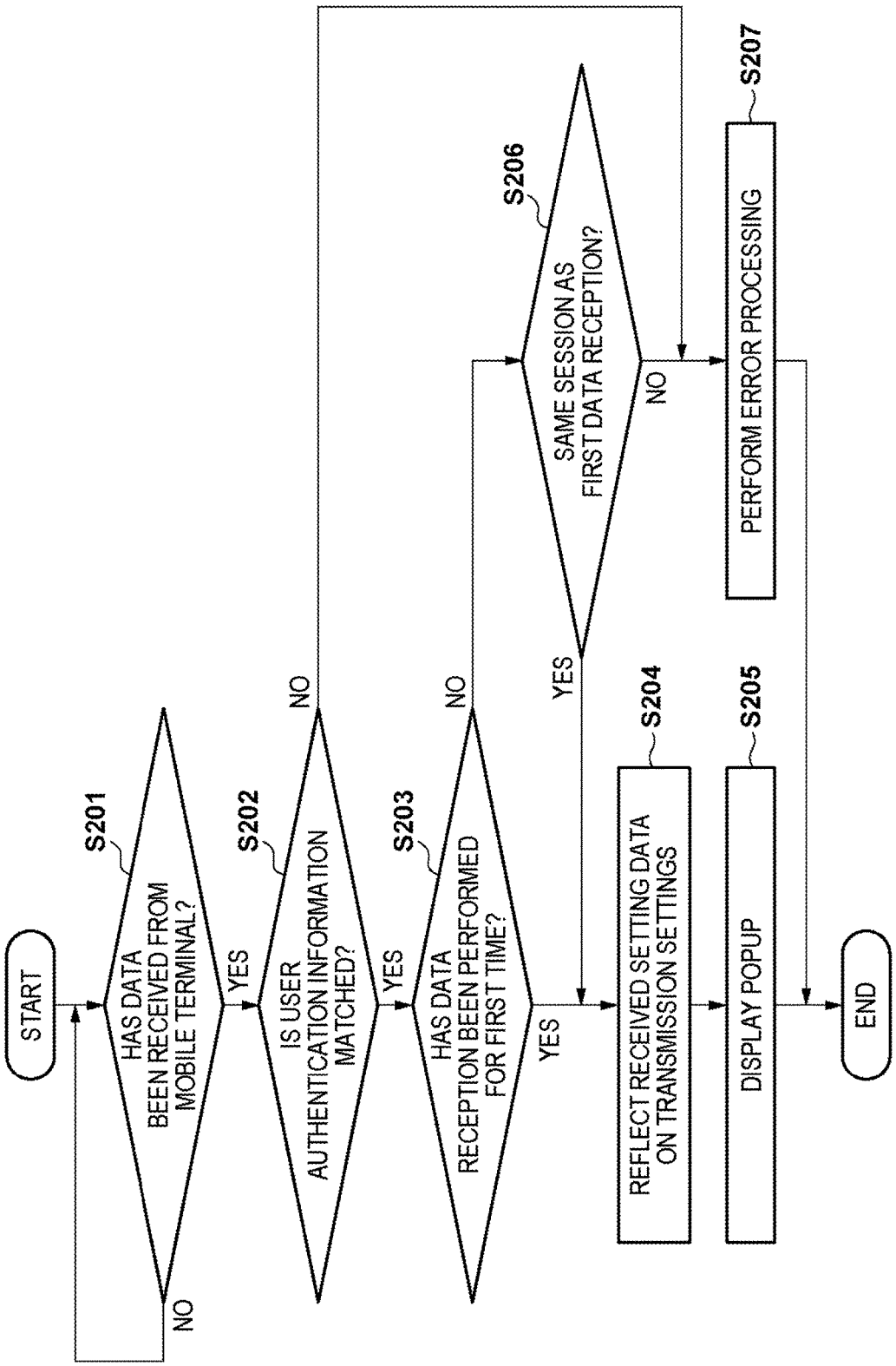
[Fig. 10]

COMMUNICATION APPARATUS THAT TRANSMITS SETTING DATA CONTROL METHOD OF THE SAME, AND STORAGE MEDIUM

TECHNICAL FIELD

The present invention relates to a communication apparatus such as a mobile terminal or the like, a control method of the same, and a storage medium.

BACKGROUND ART

In recent years, a demand to use data in a mobile terminal such as a smartphone, a tablet PC, or the like for operations in an office has increased, and a function that can cause the mobile terminal and an MFP (Multi-Function Peripheral) to cooperate has appeared. For example, Japanese Patent Laid-Open No. 2014-050015 discloses a technique in which a mobile terminal and an MFP, which support short range communication and long range communication, establish long range communication by using short range communication and exchange image data by long range communication.

Particularly, the mobile terminal first establishes short range communication (for example, NFC method wireless communication) with the MFP and obtains the connection information used for establishing long range communication (for example, Wi-Fi Direct™ method wireless communication). Subsequently, upon establishing long range communication with the MFP by using the obtained connection information, the mobile terminal performs a handover from short range communication to long range communication. According to such technique, a user can easily specify (select) a communication target MFP just by holding a mobile terminal over a predetermined position on the MFP, and data exchange by long range communication between the MFP and the mobile terminal can be implemented. As a result, for example, the setting data (for example, email address data for transmission settings) held by the mobile terminal can be provided from the mobile terminal to the MFP.

In the above-described related art, short range communication for obtaining the connection information necessary to establish long range communication needs to be performed each time setting data is exchanged between the MFP and the mobile terminal. For example, in an office environment where there is only one MFP, the user is required to hold the mobile terminal over a predetermined position on the MFP for each use of the MFP even when it is originally unnecessary to select a communication target MFP. If such an operation is frequently requested, user convenience is reduced problematically.

Additionally, as an alternative method to the above-described method of obtaining the connection information by short range communication, the connection information may be obtained from the MFP by causing a QR Code™ to be displayed on the display unit of the MFP and using the camera of the mobile terminal to read the QR code. Even if this method is to be used, if the operation of holding the mobile terminal over the display unit of the MFP is frequently requested, user convenience is reduced problematically.

On the other hand, in an office environment where the MFP is used by a plurality of users, it is better in some cases to perform data exchange after confirming that a user is near the MFP. For example, consider a case in which another user performs setting data exchange using long range communication while a given user is in the middle of using the transmission function of the MFP. In this case, setting data unintended by the user using the function of the MFP may be provided to the MFP.

SUMMARY OF INVENTION

The present invention has been made to solve the above-described problems. The present invention provides a mechanism of establishing a wireless connection for transmitting setting data from a mobile terminal to an information processing apparatus (MFP) without reducing user convenience.

According to one aspect of the present invention, there is provided a communication apparatus that transmits setting data to an information processing apparatus, comprising: storage means for storing, based on that wireless communication using a first communication method is established with the information processing apparatus, information to perform wireless communication using the first communication method with the information processing apparatus; setting means for setting a mode to transmit the setting data using the wireless communication to be established based on the information; and control means for controlling, in a case where the mode is set by the setting means, to transmit the setting data to the information processing apparatus by using the wireless communication based on the information stored in the storage means and, in a case where the mode is not set by the setting means, to transmit the setting data to the information processing apparatus by obtaining, from the information processing apparatus, the information to perform the wireless communication using the first communication method with the information processing apparatus and establishing the wireless communication using the first communication method based on the obtained information.

According to another aspect of the present invention, there is provided a control method of a communication apparatus that transmits setting data to an information processing apparatus, the method comprising: storing, based on that wireless communication using a first communication method is established with the information processing apparatus, information, in a storage unit, to perform wireless communication using the first communication method with the information processing apparatus; setting a mode to transmit the setting data using the wireless communication to be established based on the information; and controlling, in a case where the mode is set in the setting, to transmit the setting data to the information processing apparatus by using the wireless communication based on the information stored in the storage unit and, in a case where the mode is not set in the setting, to transmit the setting data to the information processing apparatus by obtaining, from the information processing apparatus, the information to perform the wireless communication using the first communication method with the information processing apparatus and establishing the wireless communication using the first communication method based on the obtained information.

According to still another aspect of the present invention, there is provided a computer-readable storage medium storing a computer program for causing a computer to execute a control method of a communication apparatus that transmits setting data to an information processing apparatus, the method comprising: storing, based on that wireless communication using a first communication method is established with the information processing apparatus, information, in a storage unit, to perform wireless communication using the first communication method with the information processing apparatus; setting a mode to transmit the setting data using the wireless communication to be established based on the information; and controlling, in a case where the mode is set in the setting, to transmit the setting data to the information processing apparatus by using the wireless communication based on the information stored in the storage unit and, in a case where the mode is not set in the setting, to transmit the setting data to the information processing apparatus by obtaining, from the information processing apparatus, the information to perform the wireless communication using the first communication method with the information processing apparatus and establishing the wireless communication using the first communication method based on the obtained information.

According to the present invention, a wireless connection for transmitting setting data from the mobile terminal to the information processing apparatus can be established without reducing user convenience.

Further features of the present invention will become apparent from the following description of exemplary embodiments (with reference to the attached drawings).

BRIEF DESCRIPTION OF DRAWINGS

FIG. 1 is a view showing an example of the arrangement of a communication system.

FIG. 2 is a block diagram showing an example of the hardware arrangement of an MFP.

FIG. 3 is a block diagram showing an example of the hardware arrangement of a mobile terminal.

FIG. 4A is a view showing an example of an operation screen displayed in the mobile terminal.

FIG. 4B is a view showing an example of an operation screen displayed in the mobile terminal.

FIG. 5A is a view showing an example of an operation screen displayed in the mobile terminal.

FIG. 5B is a view showing an example of an operation screen displayed in the mobile terminal.

FIG. 6 is a view showing an example of an operation screen displayed in the mobile terminal.

FIG. 7A is a view showing an example of an operation screen displayed in the MFP.

FIG. 7B is a view showing an example of an operation screen displayed in the MFP.

FIG. 8A is a view showing an example of an operation screen displayed in the MFP.

FIG. 8B is a view showing an example of an operation screen displayed in the MFP.

FIG. 9 is a flowchart showing a processing procedure of transmitting setting data to the MFP, executed in the mobile terminal.

FIG. 10 is a flowchart showing a processing procedure of receiving and reflecting setting data from the mobile terminal, executed in the MFP.

DESCRIPTION OF EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Arrangement of Communication System>

FIG. 1 is a view showing an example of the arrangement of a communication system according to an embodiment of the present invention. The communication system shown in FIG. 1 includes at least one mobile terminal 101 and at least one MPP (Multi-Function Peripheral) 102. In the communication system, the mobile terminal 101 can communicate with the MFP 102 and an access point 103 via communication media corresponding to these respective apparatuses. The mobile terminal 101 is a portable communication apparatus such as a smartphone, a tablet PC, or the like. The MFP 102 is an apparatus that includes multiple functions such as a print function, a scan function, a transmission function, and the like, and is an example of an information processing apparatus. Note that, an information processing apparatus may be either, for example, a printing apparatus, a printer, a copying machine, an MFP, or a facsimile apparatus.

In this embodiment, the MFP 102 is connected to the access point 103 via a wired network 120. The mobile terminal 101 can communicate with the access point 103 by a wireless LAN (to be referred to as "WLAN" hereinafter) method wireless communication and can communicate with the MFP 102 via the access point 103. The mobile terminal 101 is also capable of directly communicating with the MFP 102 by a Bluetooth™ (to be referred to as "BT" hereinafter) method, an NFC (Near Field Communication) method, or the WLAN method wireless communication. Furthermore, the mobile terminal 101 supports the BLE (Bluetooth Low Energy) standard, which is an extended specification of the BT standard, and can directly communicate with the MFP 102 by BLE method wireless communication. Note that the wireless LAN method (WLAN method) is an example of the first communication method, and the NFC method, the Bluetooth method, or the BLE method is an example of the second communication method which has a lower communication speed than the first communication method. The second communication method can be used for short range wireless communication.

<Arrangement of MFP>

FIG. 2 is a block diagram showing an example of the hardware arrangement of the MFP 102. The MFP 102 includes a CPU 201, a ROM 202, a RAM 203, an NFC reader/writer 204, a Bluetooth (BT) interface (I/F) 205, a wireless LAN (WLAN) 206, a network I/F 207, an operation unit controller 208, a disk controller 212, a printer 214, and a scanner 215. These devices are connected to a system bus 210. The MFP 102 further includes an operation panel 209 connected to the operation unit controller 208 and an HDD 213 connected to the disk controller 212.

The CPU 201 controls each device connected to the system bus 210 by reading out and executing the programs stored in the ROM 202 or the HDD 213. The control program is stored in the ROM 202. The RAM 203 is a volatile storage device that functions as the main memory of the CPU 201. The RAM 203 is used as a work area for the CPU 201 to execute various kinds of programs or a temporary storage region in which various kinds of data are temporarily stored. The HDD 213 may be used as a temporarily storage region for image data.

The operation unit controller 208 and the disk controller 212 control the operation panel 209 and the HDD 213, respectively, under the control of the CPU 201. Various buttons, a display, and the like are provided on the operation panel 209. The display includes a touch panel function capable of detecting touch operation by the user. The network I/F 207 functions as the interface for the wired network 120 such as a wired LAN or the like and is a communication module that exchanges, via the wired network 120, data with external apparatuses such as a network device, a file server, and the like. The NFC reader/writer 204, the BT I/F 205, and the WLAN I/F 206 are wireless communication modules that perform NFC communication, BT communication (including BLE communication), and WLAN communication, respectively.

The printer 214 forms (prints) an image on a sheet by a predetermined method such as an electrophotographic method, an inkjet method, or the like. The scanner 215 generates image data by optically reading an image of an original. The scanner 215 may optionally include an ADF (automatic document feeder).

The MFP 102 (WLAN I/F 206) also supports the Wi-Fi Direct™ standard. When performing wireless communication (WLAN communication) using the WLAN/F 206, the MFP 102 can operate in an infrastructure mode or a software AP mode. In the case of the infrastructure mode, the MFP 102 establishes wireless communication with an access point such as the access point 103 and communicates with an external apparatus via the access point. In the case of the software AP mode, the MFP 102 operates as an access point, and the MFP 102 directly establishes wireless communication and communicates with an external apparatus.

The MFP 102 can use the NFC reader/writer 204 to perform NFC communication with an external apparatus. The MFP 102 can use the BT I/F 205 to perform BT communication (including BLE communication) with an external apparatus. Other than the WLAN communication, the NFC communication, and the BT communication, the MFP 102 can use a two-dimensional code such as a QR Code™ to provide data (information) to an external apparatus including the mobile terminal 101. Particularly, the MFP 102 can provide data to the mobile terminal 101 by displaying a QR code which includes predetermined information on the display of the operation panel and allowing the mobile terminal 101 to read the QR code.

<Arrangement of Mobile Terminal>

FIG. 3 is a block diagram showing an example of the hardware arrangement of the mobile terminal 101. The mobile terminal 101 includes a CPU 301, a ROM 302, a RAM 303, an HDD 304, an operation panel 305, a camera 306, an NFC I/F 307, a BT I/F 308, and a WLAN I/F 309. These devices are connected to a system bus 310.

The CPU 301 controls the operation of the mobile terminal 101 by reading out a control program stored in the ROM 302 and executing the program. The RAM 303 is a volatile storage device that functions as the main memory of the CPU 301. The RAM 303 is used as a work area for the CPU 301 to execute various programs and as a temporary storage region for temporarily storing various kinds of data. The HDD 304 stores various kinds of data such as image data obtained by the camera 306 capturing an object, an electronic document, and the like.

The operation panel 305 includes a touch panel function capable of detecting a touch operation of a user and displays various screens provided by various applications, such as an OS and email transmission application, which operate on the mobile terminal 101. The user can input an operation instruction to the mobile terminal 101 by performing a touch operation on the operation panel 305. The mobile terminal 101 includes hardware keys and may be configured so that the user can input an operation instruction by using the hardware keys.

The camera 306 generates image data by capturing the object according to an image capturing instruction of the user. The image data generated by the camera 306 is stored in a predetermined storage region of the HDD 304. The NFC I/F 307, the BT I/F 308, and WLAN I/F 309 are wireless communication modules that perform NFC communication, BT communication (including BLE communication), and WLAN communication, respectively. The mobile terminal 101 can exchange data with an external apparatus such as an MFP 102 or the like via the NFC I/F 307, the BT I/F 308, or the WLAN I/F 309.

<Operation Screen of Mobile Terminal>

Examples of operation screens to be displayed on the operation panel 305 in the mobile terminal 101 will be described with reference to FIGS. 4A to 6. In FIGS. 4A to 6, operation screens 400, 410, 420, 430, and 440 provided by a mobile application are shown as examples of the operation screens that are to be displayed on the operation panel 305. Here, the mobile application is an application for determining a specific device (MFP) as the communication destination and transmitting setting data to the communication destination MFP. The mobile application is operated on the mobile terminal 101 when the CPU 301 reads out an application program stored in the ROM 302 or the HDD 304 and executes the program.

The operation screen 400 shown in FIG. 4A is a menu screen of the mobile application operating in the mobile terminal 101. The operation screen 400 is used to allow the user to select the function he/she wants to use out of the functions provided by the communication destination MFP. Function selection buttons 401 to 404 on the operation screen 400 are used so that the user can select the function to be used and instruct the start of the usage of the function. A display area 405 of the operation screen 400 displays the device (MFP) currently selected as the communication destination (communication target) by the mobile application. ("Multi-Function Peripheral X" in FIG. 4A)

A setting button 407 on the operation screen 400 is used to instruct the setting of the mobile application. When the setting button 407 is pressed, the mobile application switches the display screen of the operation panel 305 to the operation screen 410 shown in FIG. 4B.

The operation screen 410 shown in FIG. 4B is the setting screen of the mobile application. When a return button 411 is pressed on the operation screen 410, the mobile application holds the setting and switches the display screen of the operation panel 305 to the operation screen 400. If a button 412 is pressed on the operation screen 410, the mobile application displays a setting item list (not shown) of the mobile application. The setting items of the mobile application include, for example, user authentication information setting for the communication destination MFP and the settings of connection modes settable by using the operation screen 430 shown in FIG. 5B. If a button 413 is pressed on the operation screen 410, the mobile application switches the display screen of the operation panel 305 to the operation screen 420 shown in FIG. 5A.

The operation screen 420 shown in FIG. 5A is a screen to select the device (MFP) which is to be the communication destination of the mobile application. If a button 421 is pressed on the operation screen 420, the mobile application holds the settings of the MFP which is to be the communication destination and switches the display screen of the operation panel 305 to the operation screen 410 shown in FIG. 4B. In the operation screen 420, the user can select the communication destination MFP by using selection buttons 422 to 424. The mobile application sets, out of the selection buttons 422 to 424, the MFP corresponding to the button pressed by the user as the communication destination MFP.

If a button 425 is pressed on the operation screen 420, the mobile application searches whether an MFP is present within a range where wireless communication (for example, BLE communication) is possible with the mobile terminal 101. If a new MFP is discovered, the mobile application displays (that is, adds) a selection button corresponding to the discovered MFP on the operation screen 420. Note that the mobile application can detect an MFP present within the range where wireless communication is possible with the mobile terminal 101 by receiving, for example, a beacon signal periodically transmitted by each MFP.

The operation screen 430 shown in FIG. 5B is an operation screen for setting a "connection mode" to wirelessly connect with the communication destination MFP by the WLAN method. The operation screen 430 is displayed on the operation panel 305 when the user presses the button 412 on the operation screen 410 and selects the "connection mode setting" from the displayed setting item list. If a return button 431 is pressed on the operation screen 430, the mobile application holds the setting contents on the operation screen 430 and returns the display screen of the operation panel 305 to the mobile application setting item list display screen.

Here, the "connection mode" corresponds to the obtainment method of obtaining connection information to connect to the MFP by the WLAN method. In the mobile terminal 101 of this embodiment, it is possible to use, as the connection information obtainment method, reading of a two-dimensional code (QR code) displayed in the MFP, the NFC communication, the BLE communication, or the BT communication. Connection mode setting buttons 432 to 435 ("QR code", "NFC", "BLE", and "Bluetooth") corresponding to these respective obtainment methods are included in the operation screen 430. Note that information, such as an SSID, an encryption key (KEY), and the like, necessary for wireless connection by the WLAN method is included in the connection information (to be described later).

The setting button 432 is used for setting the connection mode ("QR code") used for reading the two-dimensional code (QR code) displayed in the MFP in order to obtain the connection information from the communication destination MFP. In a similar manner, the setting buttons 433 to 435 are used to set the connection modes ("NFC", "BLE", and "Bluetooth") to use the NFC communication, the BLE communication, and the BT communication, respectively, to obtain the connection information from the communication destination MFP. Note that the NFC communication, the BLE communication, and the BT communication are examples of short range wireless communication.

If the setting button 432 is pressed, "QR code" is set as the connection mode. In this case, the mobile terminal 101 captures the QR code which includes the connection information and is displayed on the display unit (operation panel) of the communication destination MFP by the camera 306 and obtains the connection information included in the captured QR code. In addition, if the setting button 433 is pressed, "NFC" is set as the connection mode. In this case, the mobile terminal 101 Connects to the Communication destination MFP by the NFC method and obtains the connection information by NFC communication from the MFP.

If the setting button 432 is pressed (selected) on the operation screen 430, the mobile application displays a setting button 436 for setting ON/OFF of the "simple mode". Here, the "simple mode" is an operation mode in which the mobile terminal 101 wirelessly connects, when connecting to the communication destination MFP by the selected connection mode, to the MFP by the WLAN method using the connection information held by the mobile terminal 101 without newly obtaining the connection information from the MFP. In the "simple mode" of this embodiment, WLAN communication with the MFP can be established without newly obtaining the connection information from the MFP, that is, setting data can be transmitted to the MFP based on the connection information stored in the mobile terminal 101.

In a case in which the simple mode is set to ON, if the mobile terminal 101 already holds the connection information corresponding to the communication destination MFP, the mobile terminal 101 can connect to the MFP without having to obtain connection information by reading a QR code or by short range wireless communication. On the other hand, even in the case in which the simple mode is set to ON, if the mobile terminal 101 does not hold the connection information corresponding to the communication destination MFP, the mobile terminal 101 obtains the connection information by reading a QR code or by short range wireless communication. Furthermore, if the simple mode is set to OFF, regardless of whether the connection information corresponding to the communication destination MFP is already held, the mobile terminal 101 obtains the connection information by reading the QR code or by short range wireless communication when connecting to the MFP.

The simple mode can be set for each of the plurality of connection modes selectable in the operation screen 430. In the operation screen 430, even if any of the setting buttons 433 to 435, other than the setting button 432, is pressed (selected), the mobile application may further display, in the same manner, the setting button for setting ON/OFF of the simple mode.

The operation screen 440 shown in FIG. 6 is a setting screen for setting, in the mobile terminal 101, transmission settings related to electronic mail (email) by the communication destination MFP. The operation screen 440 is displayed on the operation panel 305 when the user presses the function selection button 401 corresponding to "scan and transmit email" on the operation screen 400. A destination address field 441, a subject field 442, a text field 443, and a file name field 444 are included in the operation screen 440. As the settings necessary for email transmission, it is possible to input, to each field, the destination address, the subject, the text, and a name of the attached file, and characters can be input by a software keyboard or speech recognition. Note that an address can be selected from an address book stored in the mobile terminal 101 and input to the destination address field 441.

When a complete button 445 is pressed on the operation screen 440, the mobile application completes the email transmission setting and starts transmitting setting data which indicates the setting contents to the communication destination MFP. Particularly, if the simple mode is set for the currently set connection mode, the mobile application connects, without newly obtaining the connection information, to the communication destination MFP by using the already held connection information and transmits the setting data. On the other hand, if the simple mode is not set for the currently set connection mode, connection information is newly obtained by the obtainment method corresponding to the connection mode. For example, if the connection mode is "QR code", the mobile application activates the camera 306 to read the QR code which includes the connection information and is displayed on the display unit of the communication destination MFP. Subsequently, the mobile application uses the obtained connection information to connect to the communication destination MFP and transmits the setting data.

<Operation Screen of MFP>

Examples of the operation screens to be displayed on the operation panel 209 in the MFP 102 will be described with reference to FIGS. 7A to 8B. FIGS. 7A to 8B show examples of operation screens for settings related to the transmission function ("scan and transmit") when the transmission function is to be used in the MFP 102. When the transmission function is to be used, the MFP 102 can receive setting data from the mobile terminal 101 by the WLAN communication and reflect the received setting data on the transmission settings. The MFP 102 provides, to the mobile terminal 101, the connection information for connecting the mobile terminal 101 to the MFP 102 by the WLAN method. For example, the MFP 102 can enable the reading of connection information by NFC communication so that the mobile terminal 101 whose connection mode has been set to "NFC" can obtain the connection information. Alternatively, the MFP 102 can display the QR code which includes the connection information on the operation panel 209 and allow reading of the QR code by a camera so that the mobile terminal 101 whose connection mode has been set to "QR code" can obtain the connection information.

An operation screen 700 shown in FIG. 7A is a setting screen for settings related to the transmission function ("scan and transmit") in the MFP 102. In the operation screen 700, the setting related to scan processing for generating a file and the setting of file transmission destination (destination) can be performed. Note that in the operation screen 700, the file destination is in an unset state.

In the operation screen 700, a list of addresses set as the file destinations is displayed in the destination list 701. The destination address can be set by, for example, an email address, a FAX number, or an IP address. A setting button group 702 is used for changing the settings related to scan processing. A button 703 is used for displaying detailed information about the currently selected destination in the destination list 701. A button 704 is used for deleting the currently selected destination in the destination list 701. A button 705 is used for displaying a screen (not shown) that shows a menu list for other settings related to the transmission settings.

A button 706 is used for designating the destination from the mobile terminal 101 by receiving the setting data from the mobile terminal 101 and reflecting the received setting data on the transmission setting. If the button 706 is pressed on the operation screen 700, the CPU 201 displays an operation screen 710 shown in FIG. 7B on the operation panel 209.

In the operation screen 710, the user can instruct the start and end of WLAN communication to the MFP 102. FIG. 7B shows the display state of the operation screen 710 after the start of WLAN communication is instructed. When the start of WLAN communication is instructed, the MFP 102 changes to a WLAN communication standby state, and wireless connection by the WLAN method can be accepted from the mobile terminal 101. By pressing an "end" button 711, the user can instruct the end of WLAN communication to the MFP 102. Note that before the start of WLAN communication is instructed, a "start" button for instructing the start of WLAN communication is displayed on the operation screen 710 instead of the "end" button 711.

When the start of WLAN communication is instructed, the MFP 102 displays, on the operation screen 710, the information necessary for WLAN communication and shifts to the WLAN communication standby state. As an example of information necessary for WLAN communication, an SSID and KEY (connection information) and a two-dimensional code (a QR code 712) which includes the connection information are displayed on the operation screen 710.

In the WLAN communication standby state, the MFP 102 becomes a state in which the MFP is capable of providing the connection information for WLAN communication, to external apparatuses including the mobile terminal 101. Particularly, the MFP 102 sets, for example, the NFC reader/writer 204 to a card emulation mode in a state in which the connection information is held in the storage region in the NFC reader/writer 204. As a result, the mobile terminal 101 can read the connection information from the NFC reader/writer 204 by NFC communication. In this case, the mobile terminal 101 establishes WLAN communication with the MFP 102 by using the connection information obtained by NFC communication and performs a handover from the NFC communication to the WLAN communication.

In the WLAN communication standby state, the MFP 102 displays the QR code 712 which includes the connection information on the operation screen 710. As a result, the mobile terminal 101 can obtain the connection information from the QR code 712 by capturing the QR code 712 by the camera 306 and reading the QR code 712. The QR code 712 includes the connection information necessary for the mobile terminal 101 to perform WLAN communication. The connection information at least includes the SSID and KEY and the IP address of the MFP 102. The SSID and KEY are used for wireless connection to the MFP 102. The IP address of the MFP 102 is used for pairing with the MFP 102 and the like. Note that in the WLAN communication standby state, the MFP 102 may shift to the BT communication (BLE communication) enable state and provide the connection information to the mobile terminal 101 by BT communication (BLE communication).

When the end of WLAN communication is instructed, the MFP 102 cancels the WLAN communication standby state and ends the WLAN communication with the mobile terminal 101 by disconnecting the wireless connection established with the mobile terminal 101. At this time, the MFP 102 may hide the information necessary for WLAN communication on the operation screen 710.

As described above, the operation screen 710 is displayed to accept wireless connection from the mobile terminal 101 by the WLAN method upon providing the connection information to the mobile terminal 101. Hence, when the simple mode is set in the mobile terminal 101 and the connection information is already held by the mobile terminal 101, the user need not cause the operation screen 710 to be displayed on the operation panel 209 by pressing the button 706 on the operation screen 700. In such case, the mobile terminal 101 can establish wireless connection with the MFP 102 by using the already held connection information.

Next, an operation screen 720 shown in FIG. 8A is a screen displayed when the setting data is received from the mobile terminal 101 by WLAN communication. Upon receiving the setting data from the mobile terminal 101 by WLAN communication, the MFP 102 reflects the received setting data in a destination list 721 on the operation screen 720. That is, the MFP 102 adds each destination included in the received setting data to the destination list 721. Note that although the destination address may be displayed in the destination list 721, information (such as the subject, the text, the file name, and the like) other than the destination address may not be displayed. In addition, settings related to the destinations included in the destination list 721 may be allowed to be changed by pressing a button 725.

When the setting data is received from the mobile terminal 101 by WLAN communication, the MFP 102 displays a popup 730, as shown in FIG. 8B, on the operation screen 720 to notify the user that the setting data has been received from the mobile terminal 101. Note that, if an OK button 731 is pressed, the popup 730 is erased. Erroneous email transmission to an incorrect destination can be prevented by such notification to the user.

For example, assume a case in which user B, in a location away from the MFP 102, causes the mobile terminal 101 to transmit the setting data by the simple mode when user A is about to cause the MFP 102 to transmit an email. In this case, the setting data received from the mobile terminal 101 is reflected on the email transmission settings in the MFP 102. Then, if user A instructs the execution of email transmission without noticing that the setting data transmitted from the mobile terminal 101 has been reflected on the transmission settings, the email may be transmitted to a destination not intended by user A as a result. However, by notifying the user as described above, user A can definitely notice that the setting data transmitted from the mobile terminal 101 has been reflected on the transmission settings, and erroneous email transmission to the incorrect destination can be prevented.

<Processing Procedure in Mobile Terminal>

In the mobile terminal 101, when the connection information to wirelessly connect with the MFP by the WLAN method is obtained from the MFP which is set as the communication destination device, the obtained connection information is associated with the MFP and stored in the HDD 304. Hence, the mobile terminal 101 continues to hold the connection information even after the transmission of setting data to the MFP is completed and the wireless connection with the MFP is disconnected.

As described with reference to FIGS. 4A to 6, the mobile application (CPU 301) decides, according to user instruction, the MFP which is to become the transmission destination of the setting data held by the mobile terminal 101. In order to transmit the transmission data to a specific MFP (the MFP 102 hereinafter) decided as the transmission destination, the CPU 301 uses the connection information corresponding to the MFP 102 and wirelessly connects to the MFP 102 by the WLAN method. At this time, if the connection information corresponding to the MFP 102 is not stored in the HDD 304, the CPU 301 obtains the connection information from the MFP 102 and uses the obtained information. On the other hand, if the connection information corresponding to the MFP 102 is stored in the HDD 304, the CPU 301 uses the connection information stored in the HDD 304 without obtaining the connection information from the MFP 102. When the wireless connection is established with the MFP 102 in this manner, the CPU 301 transmits the setting data to the MFP 102 by WLAN communication.

In this embodiment, if the connection information corresponding to the MFP 102 which is to be the transmission destination of the setting data is already held, the mobile terminal 101 wirelessly connects to the MFP 102 by the WLAN method without newly obtaining the connection information from the MFP 102. Hence, the user need not make the gesture of holding the mobile terminal 101 over a predetermined position (for example, the position of the NFC reader/writer 204 or the position of the operation panel 209 where the QR code is to be displayed) on the MFP 102 in order to obtain the connection information from the MFP 102. Therefore, the wireless connection for transmitting the setting data from the mobile terminal 101 to the MFP 102 can be established without reducing user convenience. As a result, it becomes possible to provide the setting data held by the mobile terminal 101 to the MFP 102 by a simpler user operation.

In addition, as described above, in the mobile terminal 101 of this embodiment, the "simple mode" to wirelessly connect with the communication destination MFP without newly obtaining the connection information may be settable, and the obtainment of the connection information from the MFP may be controlled in accordance with the settings of the "simple mode". An example of controlling the obtainment of the connection information from the MFP according to the settings of this "simple mode" will be described below with reference to FIG. 9.

FIG. 9 is a flowchart showing the procedure of the processing, executed in the mobile terminal 101, to transmit setting data to the MFP 102. Each step of the processing shown in FIG. 9 is implemented by a mobile application. That is, processing of each step in FIG. 9 is implemented when the CPU 301 of the mobile terminal 101 reads out the mobile application program stored in the ROM 302 or the HDD 304 and executes the readout program. Note that in the procedures shown in FIG. 9, a case in which the connection mode of the mobile terminal 101 is set to "QR code" is shown as an example. Also, a case in which the MFP 102 performs WLAN communication by the software AP mode instead of the infrastructure mode is shown.

In step S101, the mobile application (CPU 301) determines whether or not the transmission setting, performed by the user using the operation screen 440 (FIG. 6), has been completed. The CPU 301 repeats the determination of S101 until the complete button 445 is pressed on the operation screen 440. When the complete button 445 is pressed, the transmission setting is determined to be completed, and the process advances to step S102.

In step S102, the CPU 301 determines whether or not the connection information corresponding to the MFP (MFP 102 hereinafter) set as the communication destination device by using the operation screen 420 (FIG. 5A) is being held. That is, the CPU 301 determines whether or not the connection information corresponding to the MFP 102 is stored in the HDD 304. If the connection information corresponding to the MFP 102 is not held, the CPU 301 causes the process to advance to step S103. Otherwise, the process advances to step S109. Note that as described above, the connection information at least includes the SSID and KEY necessary to wirelessly connect to the MFP 102 by the WLAN method, and the IP address of the MFP 102.

In step S103, the CPU 301 activates, according to the connection mode set to "QR code", the camera 306 in order to read the QR code which includes the connection information and is displayed on the operation panel 209 of the MFP 102. Note that if the connection mode of the mobile terminal 101 is set to, for example, "NFC", the CPU 301 displays, instead of activating the camera 306, a screen on the operation panel 305 that prompts the user to make an operation to start the NFC communication. For example, information that prompts the user to bring the mobile terminal 101 closer to (into contact with) the NFC reader/writer 204 of the MFP 102 will be shown in such a screen.

Next, in step S104, the CPU 301 uses the camera 306 to read the QR code 712 on the operation screen 710 displayed on the operation panel 209 of the MFP 102 and obtains the connection information included in the read QR code. This is implemented when the user brings the mobile terminal 101 closer to the operation panel 209 of the MFP 102 and causes the camera 306 to capture the QR code 712 during a state in which the operation screen 710 is displayed on the operation panel 209 of the MFP 102. In this manner, the user needs to operate the MFP 102 beforehand and cause the operation panel 209 to display the operation screen 710. When the obtainment of the connection information is completed, the CPU 301 causes the process to advance from step S104 to step S105.

On the other hand, if the process has advanced from step S102 to step S109, the CPU 301 determines whether or not the simple mode has been set for the current connection mode ("QR code"). If it is determined that the simple mode has not been set, the CPU 301 causes the process to advance to step S103 and obtains the connection information in the above-described manner (steps S103 and S104). On the other hand, if the CPU 301 determines that the simple mode has been set, the obtainment of the connection information (step S103 and S104) is not performed, and the process advances to step S105.

If the process advances from step S104 to step S105, the CPU 301 uses the connection information (SSID and KEY) obtained in step S104 and wirelessly connects to the MFP 102 by the WLAN method. On the other hand, if the process advances from step S109 to step S105, the CPU 301 uses connection information (SSID and KEY) that has been already held (stored in the HDD 304) and wirelessly connects to the MFP 102 by the WLAN method. Hence, the WLAN communication between the mobile terminal 101 and the MFP 102 is established, and the mobile terminal 101 can use the IP address of the MFP 102 included in the connection information to communicate with the MFP 102. Note that when the connection mode is set to "NFC", the handover from the NFC communication to the WLAN communication will be performed in step S105.

Next, in step S106, the CPU 301 transmits the user authentication information for the MFP 102 and the setting data indicating the setting contents of the operation screen 440 to the MFP 102 by the established WLAN communication. Here, the setting data is data that indicates at least the data transmission destination (destination address) setting of the transmission function of the MFP 102. Note that the wireless connection established between the mobile terminal 101 and the MFP 102 is disconnected by the MFP 102 when the user presses the "end" button 711 of the operation screen 710 of the MFP 102 as described above.

When setting data transmission is completed in step S106, the CPU 301 determines, in the subsequent step S107, whether or not the connection information used in step S105 and corresponding to the MFP 102 has been already saved (stored in the HDD 304). If the CPU 301 determines that the connection information has been already saved, the processing is ended. Otherwise, the process advances to step S108. In step S108, the CPU 301 saves, in the HDD 304, the connection information used in step S105 and corresponding to the MFP 102 and ends the processing.

<Processing Procedure in MFP>

FIG. 10 is a flowchart showing the procedure of processing, executed in the MFP 102, for receiving the setting data from the mobile terminal 101 and reflecting the received data. The process of each step shown in FIG. 10 is implemented in the MFP 102 when the CPU 201 reads out the control program stored in the ROM 202 or the HDD 213 and executes the readout program. Note that the procedure shown in FIG. 10 is executed when the transmission function is used (that is, when a transmission job is executed) in the MFP 102.

When wireless connection with the mobile terminal 101 by the WLAN method is established by using the WLAN I/F 206, the CPU 201 receives the setting data from the mobile terminal 101 by WLAN communication. In step S201, the CPU 201 determines whether or not data has been received from the mobile terminal 101 by WLAN communication. When the data is received, the process advances to step S202.

In step S202, the CPU 201 determines whether or not the user authentication information included in the received data matches the user authentication information saved in the MFP 102. If the pieces of information do not match, the process advances to step S207. If the pieces of information match, the process advances to step S203. Note that if the user authentication information is not managed in the MFP 102, the process may advance to step S203 by assuming that the user authentication information has been matched.

In this manner, if the user authentication using the received user authentication information succeeds, the CPU 201 performs the process (step S204) to reflect the setting data on the transmission settings. As a result of the process of step S202, it becomes possible to prevent erroneous transmission of data to an incorrect address. For example, if user B, who is at a location away from the MFP 102, causes a mobile terminal to transmit the setting data to the MFP 102 by the simple mode when user A is about to cause the MFP 102 to transmit data, the user authentication information will not be matched. Hence, the setting data received from the mobile terminal of user B will not be reflected on the transmission settings, and the data will not be transmitted to a destination not intended by user A.

Next, in step S203, the CPU 201 determines whether or not the data reception from the mobile terminal 101 by the WLAN communication is the first reception. Particularly, the CPU 201 saves, in the ROM 202, the session ID of the communication session of the WLAN communication in which the data reception was performed. This allows the CPU 201 to perform the determination in step S203 by confirming whether or not a corresponding session ID is already stored in the ROM 202 at the time of setting data reception. Note that the session ID saved in the ROM 202 is deleted when the transmission job is completed. In step S203, the CPU 201 causes the process to advance to step S204 if the data reception from the mobile terminal 101 is the first reception. Otherwise, the process advances to step S206.

As a result of the process of step S203, in the above-described example, if user A has transmitted the setting data from his/her mobile terminal before user B transmits the setting data from another mobile terminal, data reception from the mobile terminal of user B will not be the first reception. Hence, this can prevent the use of the transmission function from being interfered by the other user B (that is, can prevent the transmission settings from being changed from the mobile terminal of user B) while user A is using the transmission function by causing his/her mobile and the MFP 102 to cooperate with each other. Note that in a case in which user A has not caused his/her mobile terminal and the MFP 102 to cooperate, data reception from the mobile terminal of user B will become the first reception. However, a notification (to be described later) in step S205 can allow user A to definitely notice that the setting data transmitted from the mobile terminal of user B has been reflected on the transmission settings. In this manner, according to the process of step S203, it is possible to prevent data transmission to an incorrect address even if the user authentication information is not managed in the MFP 102 arranged mainly in an office.

In step S204, the CPU 201 reflects the setting data included in the received data on the transmission settings of the MFP 102 as described with reference to FIG. 8A. Furthermore, in step S205, the CPU 201 displays the popup 730 as shown in FIG. 8B to notify the user that the received setting data has been reflected on the transmission settings. Subsequently, the CPU 201 ends the processing.

On the other hand, in step S206, the CPU 201 determines whether or not this data reception is reception by the same communication session as the first data reception. If the session ID of the WLAN communication in this data reception is the same as the session ID saved in the ROM 202, the CPU 201 determines that this data reception is reception by the same communication session as the first data reception. In this case, the CPU 201 causes the process to advance to step S204 and reflects the received setting data on the transmission settings. Otherwise, the CPU 201 causes the process to advance to step S207.

In this manner, if the CPU 201 receives setting data in a state in which a communication session different from the communication session for receiving the setting data (for this data reception) has been established, the CPU 201 does not reflect the received setting data on the transmission settings. On the other hand, if the CPU 201 receives the setting data in a state in which the same communication session as the communication session for receiving the setting data (for this data reception) has been established, the CPU 201 reflects the received setting data on the transmission settings. That is, after receiving the setting data, if additional data is received by the same communication session as the communication session for receiving the setting data, the CPU 201 reflects the additional setting data on the transmission settings. Hence, in the above-described example, the MFP 102 can cope with a situation in which additional setting data is transmitted from the mobile terminal of user A after the setting data from the same mobile terminal has been transmitted to the MFP 102.

If the process advances from step S202 or S206 to step S207, the CPU 201 performs error processing. For example, if the user authentication information is not matched in step S202, the CPU 201 notifies the mobile terminal 101, corresponding to the setting data transmission source, that it has failed to reflect the setting data on the transmission settings due to mismatching of user authentication information. In addition, if the session ID does not match in step S206, the CPU 201 notifies the mobile terminal 101, corresponding to the setting data transmission source, that it has failed to reflect the setting data on the transmission settings since another user is already currently using the transmission function.

As described above, in this embodiment, if the mobile terminal 101 already holds the connection information corresponding to the MFP 102 that will be the setting data transmission destination, the mobile terminal 101 wirelessly connects to the MFP 102 by the WLAN method without newly obtaining the connection information from the MFP 102. According to this embodiment, wireless connection for transmitting setting data from the mobile terminal 101 to the MFP 102 can be established without reducing user convenience and the setting data can be provided from the mobile terminal 101 to the MFP 102.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-212334, filed Oct. 28, 2015, which is hereby incorporated by reference herein in its entirety.

The invention claimed is:

1. A communication apparatus that transmits setting data to an information processing apparatus, comprising:
   one or more processors connected to a memory, the one or more processors being configured to:
   store, based on that the communication apparatus connects the information processing apparatus via a wireless communication of a first communication method, connection information necessary for wirelessly connecting to the information processing apparatus via the wireless communication of the first communication method;
   display a setting screen for setting a mode in which the communication apparatus connects to the information processing apparatus via the wireless communication of the first communication method by using the stored connection information;
   transmit the setting data to the information processing apparatus via the wireless communication of the first communication method that is established based on the stored connection information in a case where the mode is set and the connection information has been already stored; and
   transmit the setting data to the information processing apparatus via the wireless communication of the first communication method that is established based on connection information newly obtained from the information processing apparatus in a case where the mode is not set, regardless of whether connection information has been already stored.

2. The apparatus according to claim 1, further comprising:
a camera,
wherein the connection information is obtained by capturing, with the camera, a barcode which is displayed on the information processing apparatus.

3. The apparatus according to claim 2, wherein the barcode is a two-dimensional code.

4. The apparatus according to claim 1,
wherein the connection information is obtained from the information processing apparatus via a wireless communication of a second communication method which has a lower communication speed than the first communication method.

5. The apparatus according to claim 4, wherein the first communication method is a wireless LAN method and the second communication method is one of an NFC method, a Bluetooth method, and a BLE method.

6. The apparatus according to claim 1, wherein the setting data includes an email address that is to be used in a transmission function which transmits, to the outside, an image obtained by scanning an original using a scanner device of the information processing apparatus.

7. The apparatus according to claim 6, wherein the setting data further includes one of an email subject and a text to be used when performing transmission to the email address.

8. The apparatus according to claim 7, wherein the one or more processors further configured to:
display an acceptance screen for accepting a setting of the email address, the email subject and the text,
wherein the setting data transmitted to the information processing apparatus includes the setting accepted via the acceptance screen.

9. The apparatus according to claim 1, wherein the one or more processors further configured to:
transmit the setting data to the information processing apparatus via the wireless communication of the first communication method that is established based on connection information newly obtained from the information processing apparatus in a case where the mode is set and the connection information has not been stored yet.

10. A control method of a communication apparatus that transmits setting data to an information processing apparatus, the method comprising:
storing, based on that the communication apparatus connects the information processing apparatus via a wireless communication of a first communication method, connection information necessary for wirelessly connecting to the information processing apparatus via the wireless communication of the first communication method;
displaying a setting screen for setting a mode in which the communication apparatus connects to the information processing apparatus via the wireless communication of the first communication method by using the stored connection information;
transmitting the setting data to the information processing apparatus via the wireless communication of the first communication method that is established based on the stored connection information in a case where the mode is set and the connection information has been already stored; and
transmitting the setting data to the information processing apparatus via the wireless communication of the first communication method that is established based on connection information newly obtained, from the information processing apparatus in a case where the mode is not set, regardless of whether connection information has been already stored.

11. The control method according to claim 10, wherein the method further comprising:
transmitting the setting data to the information processing apparatus via the wireless communication of the first communication method that is established based on connection information newly obtained from the information processing apparatus in a case where the mode is set and the connection information has not been stored yet.

12. A non-transitory computer-readable storage medium storing a computer program for causing a computer to execute a control method of a communication apparatus that transmits setting data to an information processing apparatus, the method comprising:
storing, based on that the communication apparatus connects the information processing apparatus via a wireless communication of a first communication method, connection information necessary for wirelessly connecting to the information processing apparatus via the wireless communication of the first communication method;
displaying a setting screen for setting a mode in which the communication apparatus connects to the information processing apparatus via the wireless communication of the first communication method by using the stored connection information;
transmitting the setting data to the information processing apparatus via the wireless communication of the first communication method that is established based on the stored connection information in a case where the mode is set and the connection information has been already stored; and
transmitting the setting data to the information processing apparatus via the wireless communication of the first communication method that is established based on connection information newly obtained, from the information processing apparatus in a case where the mode is not set, regardless of whether connection information has been already stored.

13. The non-transitory computer-readable storage medium to claim 12, wherein the method further comprising:
transmitting the setting data to the information processing apparatus via the wireless communication of the first communication method that is established based on connection information newly obtained from the information processing apparatus in a case where the mode is set and the connection information has not been stored yet.

* * * * *